(12) United States Patent
Mantell

(10) Patent No.: US 7,331,158 B2
(45) Date of Patent: Feb. 19, 2008

(54) PROCESS AND SYSTEM FOR PRODUCT PACKAGING

(75) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 164 days.

(21) Appl. No.: 11/126,004

(22) Filed: May 10, 2005

(65) Prior Publication Data

US 2006/0259182 A1 Nov. 16, 2006

(51) Int. Cl.
*B65B 61/02* (2006.01)
*B65B 57/02* (2006.01)

(52) U.S. Cl. ............................... 53/411; 53/458; 53/51; 53/64

(58) Field of Classification Search .................. 53/411, 53/425, 426, 452, 456, 458, 51, 64; 700/115, 700/116
See application file for complete search history.

(56) References Cited

U.S. PATENT DOCUMENTS

| | | | |
|---|---|---|---|
| RE33,054 E | 9/1989 | Markham | 235/385 |
| 5,143,362 A | 9/1992 | Doane et al. | 270/1.1 |
| 5,715,653 A * | 2/1998 | Weinmann et al. | 53/411 |
| 5,740,338 A | 4/1998 | Gauthier et al. | 358/1.17 |
| 6,119,434 A * | 9/2000 | Andersson | 53/237 |
| 6,125,760 A | 10/2000 | Graushar et al. | 101/490 |
| 6,378,275 B1 * | 4/2002 | Andersson | 53/458 |
| 6,447,625 B1 * | 9/2002 | Schmid et al. | 53/411 |
| 6,542,913 B1 | 4/2003 | Deriso et al. | 707/515 |
| 6,609,041 B1 * | 8/2003 | Sanka et al. | 700/115 |
| 6,629,006 B1 * | 9/2003 | Weinmann | 700/221 |
| 6,739,110 B2 * | 5/2004 | Ogden et al. | 53/411 |
| 6,769,228 B1 * | 8/2004 | Mahar | 53/411 |
| 6,814,513 B2 | 11/2004 | Sesek | 400/103 |
| 2001/0032441 A1 | 10/2001 | Ogden et al. | 53/411 |
| 2002/0026768 A1 * | 3/2002 | Duncan et al. | 53/52 |
| 2003/0189727 A1 | 10/2003 | Kloosterman et al. | 358/1.18 |
| 2004/0007868 A1 | 1/2004 | Werling | 283/67 |
| 2004/0098158 A1 * | 5/2004 | Andersson et al. | 700/115 |
| 2004/0210319 A1 | 10/2004 | Lapstun et al. | 700/1 |

FOREIGN PATENT DOCUMENTS

EP 0 554 989 A1 8/1993

OTHER PUBLICATIONS

Whalen, George J., "Variable Data Printing Gains New Footholds, Part 2,"Jul. 26, 2004, (4 pp.) http://www.ondemandjournal.com/specialfeatures/whalen11.cfm—Feb. 14, 2005.

* cited by examiner

*Primary Examiner*—Louis Huynh
(74) *Attorney, Agent, or Firm*—Alix, Yale & Ristas, LLP

(57) ABSTRACT

A process and system are provided for printing variable data on packaging material at a package printer and machine reading the variable data on a packaging facility packaging line and associating the variable data with other information in a computer database. The process and system render unnecessary the use of a printing stage at the packaging facility, thereby improving packaging efficiency.

25 Claims, 4 Drawing Sheets

PROCESS AND SYSTEM FOR PRODUCT PACKAGING

TECHNICAL FIELD

A process and system are described for efficiently identifying individual product packages.

BACKGROUND

Product packaging is used to identify the contents of the package. Typically, a large quantity of boxes or bags is printed by a printing company and then shipped to a packaging facility where the packages are filled. Additional markings such as alphanumeric characters often are added to packages at the packaging facility using a low resolution printing process in order to track inventory or to provide manufacturing or expiration dates for the package contents. This type of package identification requires an additional printing or labeling step at the factory.

It is known to identify an individual item with a number that is specific to the item. Costly products such as television sets, computers and automobiles frequently have a unique serial number embossed or otherwise attached to the body of the product so that this number will be visible on the product during its useful life. Computer software is often sold with a unique identifying number or watermark inside the package in order to limit its reproduction beyond the scope of the intended license.

Courier services and film developers often use unique numerical sequences and/or bar codes that are preprinted on envelopes or package mailing labels in order to associate a particular envelope or package with a sender and a receiver at the time the package is addressed or shipped. This type of shipping procedure typically is used for packages containing unique items so that the packages can be located if they are lost.

U.S. Published Patent Application No. 2004/0007868 discloses a book covering with a unique identifier printed thereon and a method for printing a book covering using a printing press which has means for printing variable data. This document also discloses a method for printing a product package which includes printing a unique identifier on the package stock with a variable data printing apparatus. The variable data can be printed on-press along with non-variable data.

European Patent Application No. 554989-A1 (1993) is directed to a method of preparing packaging material with variable data printed thereon using an ion deposition or toner technology process. The non-variable data on the packaging material either can printed along with the variable data using ion deposition or toner technology, or in a separate printing process using a different type of printing process.

SUMMARY

One embodiment described herein is a process for packaging goods, comprising obtaining a lot of packaging material, printing a first set of variable data directly on the lot of packaging material, delivering the lot of packaging material with the first set of variable data printed thereon to a packaging line, filling the lot of packaging material on the packaging line with items using an automated packaging machine, machine reading the first set of variable data on the lot of packaging material at the time of filling, and automatically associating a second set of data relevant to the items with the first set of machine read variable data.

Usually, the first set of variable data is printed on the lot of packaging material at an off-site location relative to the packaging line. Filling typically includes forming three dimensional packages from the lot of packaging material and sealing the packages. The second set of data frequently includes information relevant to package contents, manufacturing conditions, and/or packaging conditions, and usually includes at least one of the packaging date, time of packaging, ambient packaging facility conditions such as temperature, humidity and/or pressure at the time of packaging, and the source of the packaged items.

The process sometimes further comprises pre-forming the lot of packaging material after printing and before filling. The quality of individual packages in the lot of packaging material often is automatically checked before filling.

In many cases, the process further comprises printing a third set of non-variable data on the lot of packaging material. The third set of data often identifies the packaged items and is usually non-variable. The first and third sets of data can be printed using the same printing device.

Usually, the lot of packaging material includes a plurality of packages, and each package in the lot is printed with different variable data. In some cases, the variable data is common for a small number of packages, such as a small lot of packages or a portion of a large lot, in accordance with the need for later distinguishing packages and recovering data associated with them at the time of filling. For security reasons it may be desirable for the first set of variable data to be coded.

Another embodiment is a process for creating a computer database to track an individual packaged item in a group of substantially identical packaged items, comprising obtaining a lot of unfilled packages having a first set of variable data printed thereon, automatically filling the packages, determining the first set of variable data and storing it in a computer database at the time of filling, and associating the first set of variable data with a second set of data, both the first set of variable data and the second set of data being stored in the computer database.

The first set of variable data usually is machine read. Sometimes, the first set of variable data is sequentially determined from the starting point of the lot. Sequential variable data can be provided with the lot of unfilled packages, and are typically provided by the printing facility.

Often, the second set of data is input into the database when the packages are filled. The first set of variable identifying data sometimes is read before the packages are filled. In certain cases, the process further comprises automatically checking package quality before filling the packages and rejecting low quality packages. The first set of variable identifying data usually is printed at a first location and the packages are filled at a second location that is remote relative to the first location.

The computer database typically can be used to recover the second set of data for a specific package using data from the first set of variable data. The computer database frequently can be used to identify which values from the first set of variable data corresponds to specific values of the second set of data.

A further embodiment is a system for identifying packages in a group, comprising a first printing device connected to a first computer, the first printing device being configured to print variable data on the packages, an automatic packaging machine disposed at a remote location relative to the first printing device, a variable data machine reader positioned proximate the automatic packaging machine, and a second computer connected to the variable data machine reader, the second computer storing the variable data in a computer database and associating the variable data with other data in the computer database. A package pre-forming device frequently is included before the automatic packaging machine. Sometimes, an automated package quality reader is disposed proximate the automatic packaging machine. In most cases, the computer database can be used to recover the second set of data for a specific package using a value from the first set of variable data. The computer database usually can be used to identify which data from the first set of variable data corresponds to specific values of the second set of data.

DETAILED DESCRIPTION

Figure 1:
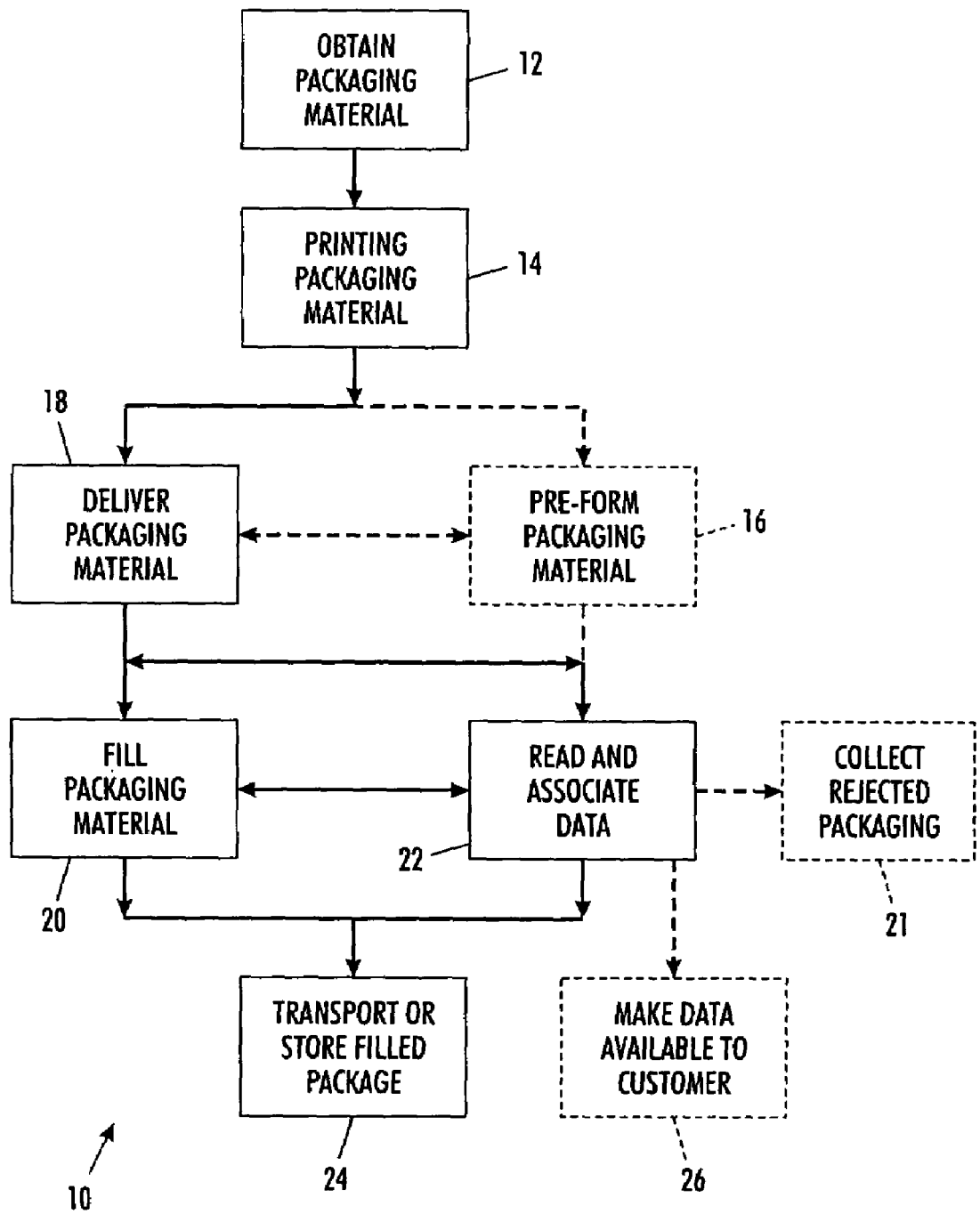
FIG. 1 is a diagram showing a process for printing variable data on product packaging and subsequently reading and associating the data.

Referring to the drawings and first to FIG. 1, a process for product packaging is shown and is generally designated as 10. At a package printer, packaging material is obtained at 12 and is printed at 14 with both non-variable data, typically both graphics and alphanumeric characters which are indicative of the product contents, and also variable, unique identifying data. Usually, the non-variable data are the same on each package in a particular lot, while the variable data are different on each package in the lot. Sometimes, however, a small number of different sets of non-variable data are intermixed. This occurs particularly when multiple packages are printed from a particular master, which are later cut into individual packages. The variable and non-variable data can be printed with the same printing device or different printing devices. For cases in which one elongated sheet of packaging material is later cut to form multiple packages, multiple sets of the non-variable data and the variable data are printed on the sheet at appropriate locations on the sheet.

As used herein, "unique identifying data" include numbers, letters, combinations of numbers and letters, codes having one, two, or three dimensions, including but not limited to bar codes, and machine readable variable graphics. Frequently, the unique identifying data are numeric or alphanumeric variable data. A "lot of packaging material" refers to a batch of packaging material which has been or will be formed into packages that are part of the same group. The packaging material can be in the form of an elongated sheet or a group of individual packages. For the purposes of discussion herein, the term "printing device" shall include all different types of printing presses, printers, or other hardcopy rendering apparatus and devices.

After the data have been printed, the packaging is pre-formed into a package shape, if necessary, at 16. More specifically, if the packaging material must be cut, folded, adhered or otherwise pre-formed, some or all of the pre-forming can occur at the package printer. Alternatively, all of the pre-forming can take place after delivery to the packaging facility. Packaging which is pre-formed at the package printer usually is sent to the packaging facility in a flattened state and is then shaped into an appropriate three dimensional shape before it is filled. Large, printed rolls or sheets of packaging material can be shipped to the packaging facility and then cut, folded, adhered, and further pre-formed at the packaging facility prior to filling.

The packaging material is delivered from the package printer to the packaging facility at 18. After any necessary preparation for filling, including any pre-forming that did not take place at the package printer, the packaging is filled at 20. Part of the filling stage usually includes shaping the package into a three dimensional shape and sealing the package. At the time of filling, the unique identifying data are machine read from the package at 22. Soon thereafter, the read data is associated in a computer.

The variable data may have been printed in a form that can only be read by machine. For example, it can be printed with a material that cannot be seen without special lighting, or with a material that can be read with special equipment, such as a magnetic reader. Suitable types of machine reading devices include but are not limited to electronic scanners, laser scanners, optical readers, digital cameras, and digital video cameras. As used herein, "at the time of filling" refers to a window of time before, during and after the filling process. More specifically, machine reading of a particular package takes place at an instant within a timeframe that begins when the package arrives in the packaging area and ends when the filled package leaves the packaging area. The packaging area constitutes the rooms or sections of the packaging facility where packaging takes place. Typically, the machine reading takes place in a time period of less than one second. This time period often is within a timeframe that begins about two minutes before the filling process and ends about one minute after the filling process. Machine reading which is done after filling usually is performed on the packaging line. For oddly shaped packages and flexible bags, it usually is preferable to read the variable data before the package is formed into a three-dimensional shape to ensure that the package can be properly positioned for accurate machine reading. Packages which cannot be successfully read optionally can be collected at 21.

As an alternative to reading the variable data on each individual package, a first set of variable data which is sequential can be determined if the value of the variable data on the first package in the lot of packaging material is supplied by the package printer or is read from the first package in the lot. For example, in a lot of one hundred sequentially numbered packages in which the first package is numbered 0101, the fiftieth package is numbered 0150 as long as no defective packages have been located and eliminated. The other package numbers also will be known. This data can be entered in the database and associated with a second set of data. The database can later be used to recover certain values in the second set of data for a specific package by finding or using a value from the first set of data. The database can also be used to identify which first data value or values correspond to a specific value of the second set of data.

As indicated above, the machine read data are stored in a computer database. In some cases, the database is automatically updated with information such as the location, date, time, item style, state of the manufacturing or packaging line, etc. This information may come, for example, from the packaging machine and may be input into the computer before or after the variable data are machine read depending upon whether the variable data are read before or after filling. The data can be maintained in electronic form and/or printed in document form. The machine reading and association of the variable data, which has been printed at the package printer, eliminates the need for a printing process at the packaging facility.

The filled and read packages are then transported or sent to storage at 24. Meanwhile, the data that were read at 22 and the associated data can be used by the packaging facility, and some of the data can be made available to an actual or potential customer at 26. The data can be used for a variety of quality control purposes. For example, the data can be used for pinpointing the packaging time and/or conditions for a particular item that is later found to be defective, locating a particular defective item or set of items, and responding to information requests from customers.

Figure 2:
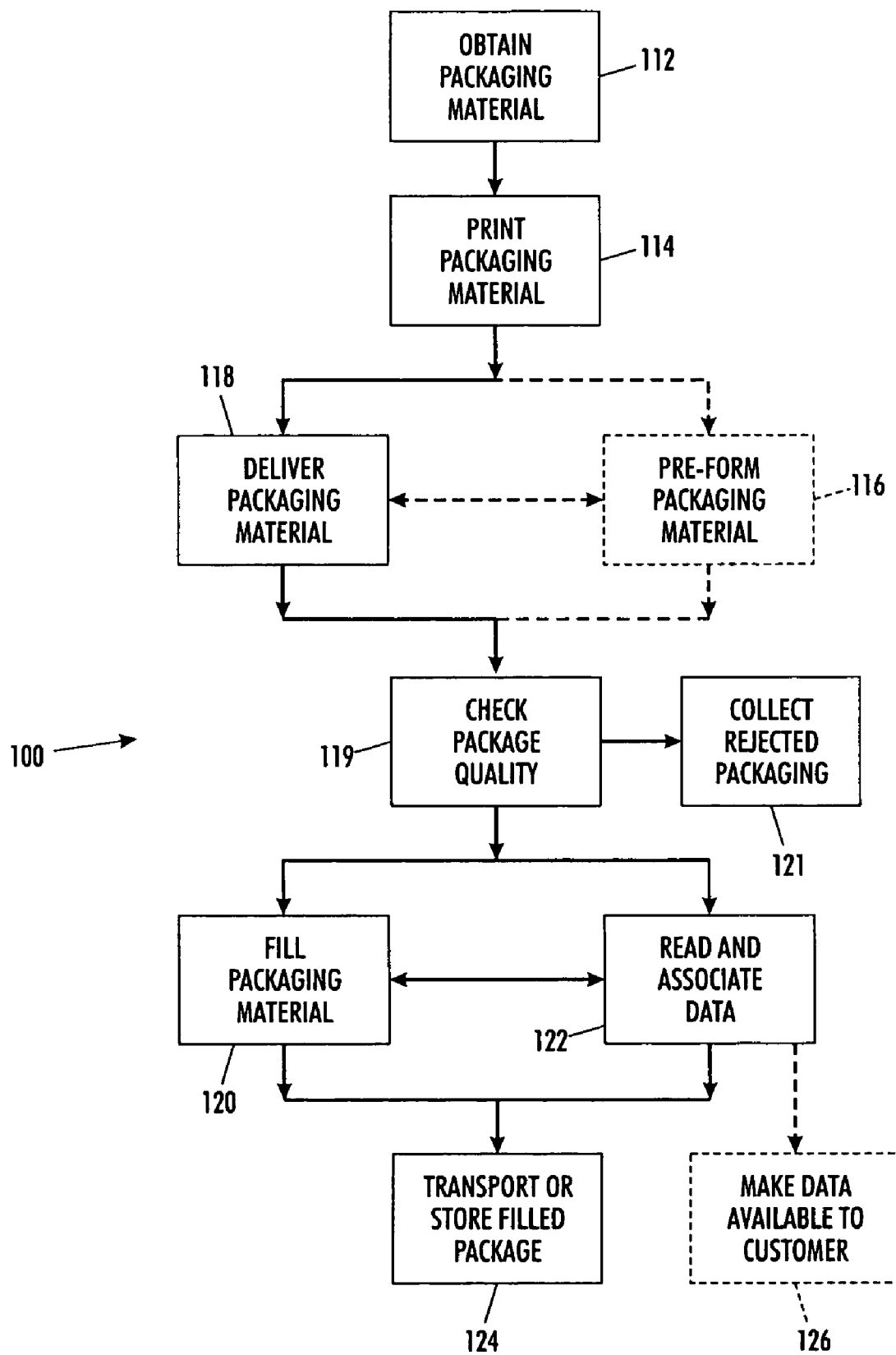
FIG. 2 is a diagram showing a process for printing variable data on product packaging and subsequently reading and associating the data, with packaging quality being checked before the packaging is filled.

Referring next to FIG. 2, a process of product packaging is shown and is designated as 100. Packaging material is obtained at 112 and printed with non-variable data and variable data at 114. The packaging material optionally is pre-formed at 116 before and/or after delivery to a packaging facility packaging line at 118. Before filling, the quality of the packaging material is checked at 119 using an automated quality checking device and any unacceptable packaging material is collected at 121. Non-limiting examples of suitable quality checking devices include digital scanners, cameras, and video cameras. This quality control process is particularly advantageous if substantial pre-forming takes place after delivery from the package printer.

In one embodiment, if the package printer delivers long rolls of packaging material, and the package printer's own quality control procedure (not shown) has determined that a portion of material in the center of the roll is of substandard quality, the package printer can provide the packaging facility with the variable data which appear on the substandard packaging, thereby enabling the defective packaging to be removed from the packaging line without wasting the acceptable parts of the roll. The remaining packaging is filled at 120 and the variable data are read at 122 at the time of filling and are associated with other data soon thereafter. It is possible to combine checking of packaging quality at 119 and reading of variable data into a single reading stage in which defective packages from the middle of a roll are located by reading the variable data and are then removed from the packaging line before filling.

After the variable data have been read and associated, the filled packages are transported or stored at 124. Data, including the variable data and any data associated with the variable data, can be made available to others in the packaging facility and/or to actual or potential customers at 126.

Figure 3:
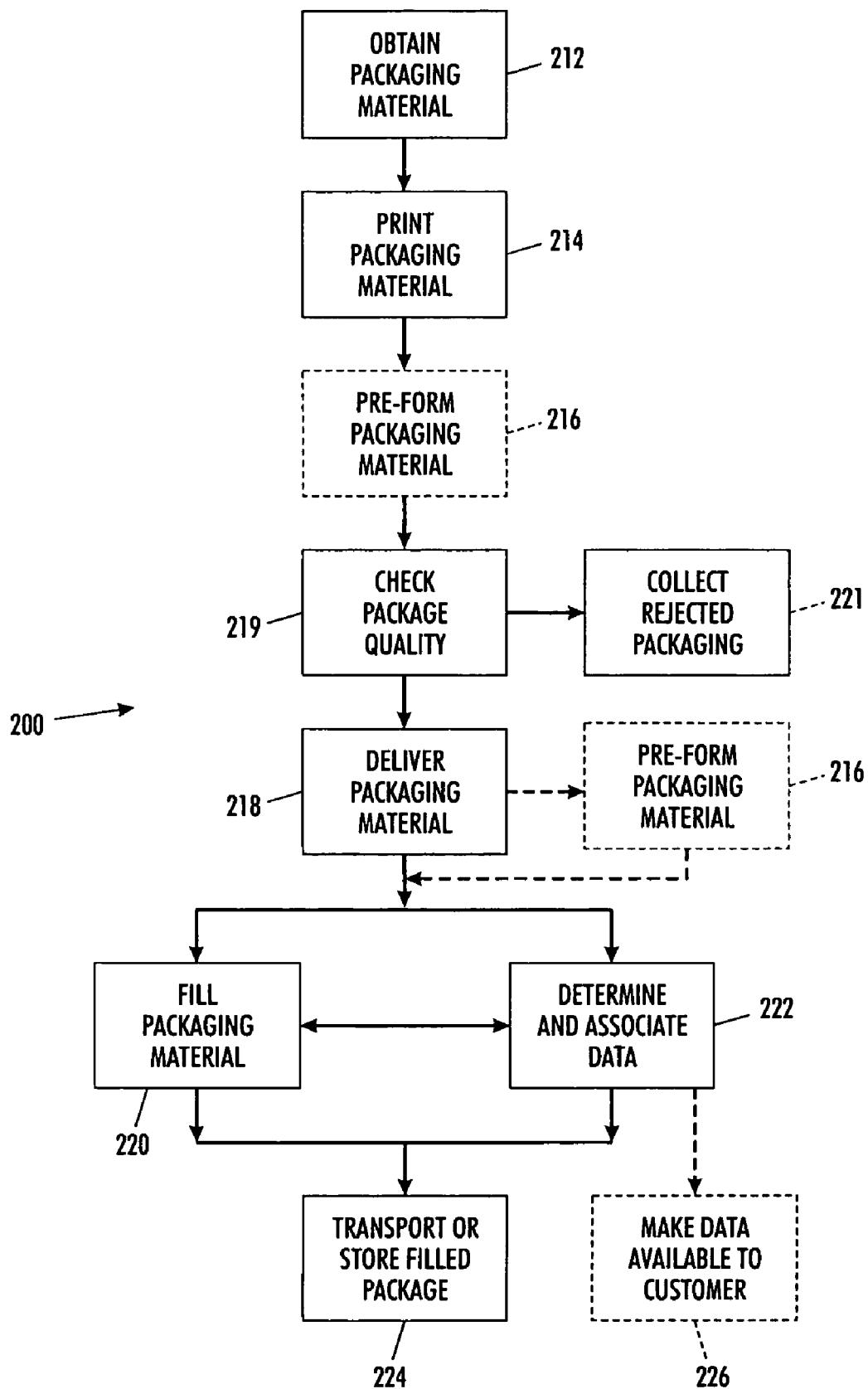
FIG. 3 is a diagram showing an alternative to the embodiment shown in FIG. 2.

In the embodiment shown in FIG. 3, a process for product packaging is shown and is designated as 200. Quality checking and removal of defective packaging takes place at the package printer. Packaging material is obtained at 212, printed with non-variable data and variable data at 214, and optionally preformed at 216. After any pre-forming taking place at the package printer, the package quality is automatically inspected at 219 using a digital scanner, camera, video camera, or another suitable device and rejected packaging is collected at 221. Acceptable packaging is delivered to the packaging facility at 218, where any additional pre-forming that is required takes place. The variable data are then determined at 222 at the time of filling at 220 and are associated with other data soon thereafter. The data can be determined by machine reading each package, or by determining the first value in the lot and sequentially determining the variable data from the starting point in the lot, as when the data constitute a numerical sequence. Filled packages are transported or stored at 224. The data that were machine read, and/or the associated data, can be made available to others in the packaging facility and/or potential customers at 226.

Figure 4:
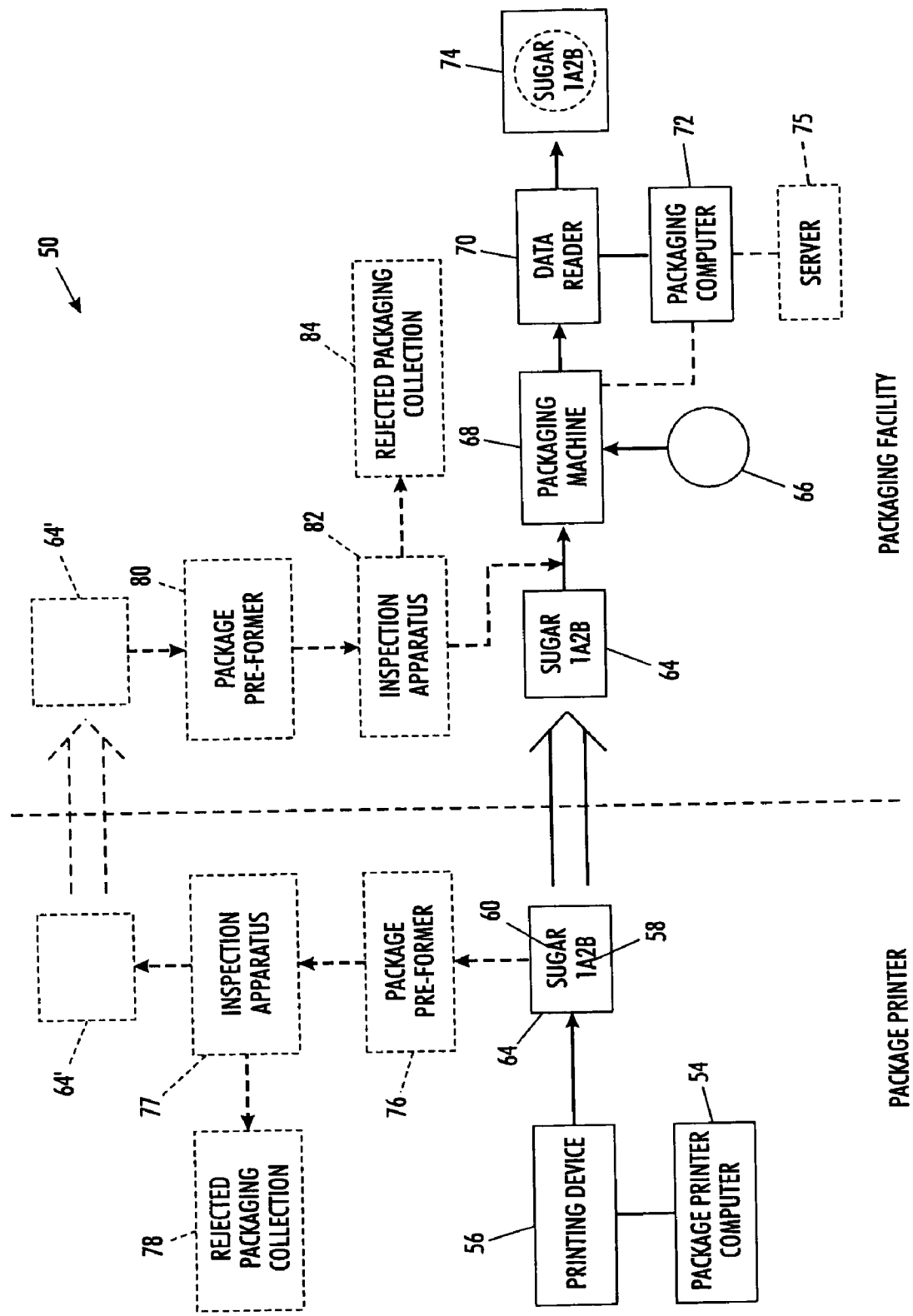
FIG. 4 is a schematic drawing showing equipment used in the processes depicted in FIGS. 1-3.

FIG. 4 shows a system of hardware for practicing the processes shown in FIGS. 1-3. The overall system is designated as 50. A package printer computer 54 controls a printing device 56, which prints the variable data 58 on the packaging material 64. Optionally, the package printer computer 56 also controls the printing of the non-variable data 60 on the packaging 64 using printing device 56 or another printing device (not shown). The printed packaging 64 is then delivered to the packaging facility where the product 66 to be packaged is automatically packaged using packaging machine 68. The data reader 70 reads the variable data at the time of packaging. FIG. 4 depicts machine reading after the package is filled, although, as indicated above, reading can occur before the package is filled. The packaging computer 72 stores the read data and associates it with other data, some of which optionally can be obtained from the packaging machine 68. The filled package 74 is ready for transport or storage. The packaging computer 72 usually is connected to a server 75, which typically is also connected to other computers in the packaging facility.

As is also shown in FIG. 4, in some cases the package printer will have a package pre-former 76 to cut, fold, and/or adhere packaging material to form packages. The preformed packages 64' can be inspected using an inspection apparatus 77 and rejected packaging can be collected using a rejected packaging collection device 78. The remaining packaging is then delivered to the packaging facility. In certain cases, the packaging facility will have a package pre-former 80 to cut, fold, and/or adhere packaging material to form packages. The preformed packages 64' optionally can be inspected using an inspection apparatus 82 and rejected packaging can be collected using a rejected packaging collection device 84. Occasionally, when package quality standards are particularly high and part of the pre-forming occurs at the package printer while the rest of the pre-forming occurs at the packaging facility, inspection equipment and rejected package collection equipment can used at both the package printer and the packaging facility.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A process for packaging goods, comprising:
obtaining a lot of packaging material containing at least fifty packages,
printing a first set of variable data directly on the lot of packaging material, each package in the lot being printed with different variable data,
delivering the lot of packaging material with the first set of variable data printed thereon to a packaging line,
filling the lot of packaging material on the packaging line with items using an automated packaging machine,
machine reading the first set of variable data on the lot of packaging material at the time of filling, and
automatically associating a second set of data relevant to the items with the first set of machine read variable data, the second set of data including at least one of a packaging date, a time of packaging, ambient packaging facility conditions at the time of packaging, and a source of packaged items.

2. The process of claim 1, wherein the first set of variable data is printed on the lot of packaging material at an off-site location relative to the packaging line.

3. The process of claim 1, wherein filling includes forming three dimensional packages from the lot of packaging material and sealing the packages.

4. The process of claim 1, further comprising pre-forming the lot of packaging material after printing and before filling.

5. The process of claim 4, further comprising automatically checking the quality of individual packages in the lot of packaging material before filling.

6. The process of claim 1, further comprising automatically checking the quality of individual packages in the lot of packaging material before filling.

7. The process of claim 6, wherein machine reading and automatic checking occur simultaneously.

8. The process of claim 1, further comprising printing a third set of data on the lot of packaging material.

9. The process of claim 8, wherein the third set of data identifies the packaged items.

10. The process of claim 8, wherein the third set of data is non-variable.

11. The process of claim 8, wherein the first and third sets of data are printed using the same printing device.

12. The process of claim 1, wherein the first set of variable data is coded.

13. The process of claim 1, wherein the first set of variable data is a bar code.

14. The process of claim 1, wherein the reading device comprises at least one member selected from the group consisting of electronic scanners, laser scanners, optical readers, digital cameras, and digital video cameras.

15. The process of claim 1, wherein machine reading occurs within one minute after filling.

16. The process of claim 1, wherein no data is printed on the packaging material after the lot of packaging material has been delivered.

17. The process of claim 1, wherein the second set of data is not printed on the packaging material.

18. A process for packaging goods, comprising:
obtaining a lot of packaging material containing at least fifty packages,
printing a first set of sequential variable data directly on the lot of packaging material each package in the lot being printed with different variable data,
automatically entering the first set of sequential variable data in a database,
delivering the lot of packaging material with the first set of sequential variable data printed thereon to a packaging line,
filling the lot of packaging material on the packaging line with items using an automated packaging machine, and
automatically associating a second set of data relevant to the items with the first set of sequential variable data, the second set of data including at least one of a packaging date, a time of packaging, ambient packaging facility conditions at the time of packaging, and a source of packaged items.

19. The process of claim 18, wherein the first set of variable data is printed on the lot of packaging material at an off-site location relative to the packaging line.

20. The process of claim 18, further comprising automatically checking the quality of individual packages in the lot of packaging material before filling.

21. The process of claim 18, further comprising printing a third set of data on the lot of packaging material.

22. The process of claim 21, wherein the first and third sets of data are printed using the same printing device.

23. The process of claim 21, wherein the third set of data identifies the packaged items.

24. The process of claim 18, wherein the second set of data is not printed on the packaging material.

25. The process of claim 18, wherein no data is printed on the packaging material after the lot of packaging material has been delivered.

* * * * *